(12) United States Patent
Fukutome et al.

(10) Patent No.: US 10,935,074 B2
(45) Date of Patent: Mar. 2, 2021

(54) LINEAR BEARING AND LINEAR BEARING WITH HOUSING

(71) Applicant: HEPHAIST SEIKO CO., LTD., Kawagoe (JP)

(72) Inventors: Hiroto Fukutome, Kawagoe (JP); Hailian Yin, Kawagoe (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/499,002

(22) PCT Filed: Mar. 30, 2018

(86) PCT No.: PCT/JP2018/013696
§ 371 (c)(1),
(2) Date: Sep. 27, 2019

(87) PCT Pub. No.: WO2018/181928
PCT Pub. Date: Oct. 4, 2018

(65) Prior Publication Data
US 2020/0049197 A1  Feb. 13, 2020

(30) Foreign Application Priority Data

Mar. 31, 2017 (JP) .............................. JP2017-070146
Mar. 31, 2017 (JP) .............................. JP2017-070147
Feb. 9, 2018 (JP) .............................. JP2018-022502

(51) Int. Cl.
*F16C 29/06* (2006.01)

(52) U.S. Cl.
CPC ...... *F16C 29/0688* (2013.01); *F16C 29/0607* (2013.01); *F16C 29/0678* (2013.01)

(58) Field of Classification Search
CPC ...... F16C 29/04; F16C 29/06; F16C 29/0602; F16C 29/0604; F16C 29/0607;
(Continued)

(56) References Cited

U.S. PATENT DOCUMENTS 3,545,826 A * 12/1970 Magee ................. F16C 29/069
384/43
4,456,312 A    6/1984 Rogers, III et al.
(Continued)

FOREIGN PATENT DOCUMENTS

DE    4318427    * 12/1994
JP    S51-9851 B1    3/1976
(Continued)

OTHER PUBLICATIONS

Translation of JP 57-33218 obtained Jul. 23, 2020.*
Translation of JP 2018-13157 obtained Jul. 23, 2020.*

*Primary Examiner* — James Pilkington
(74) *Attorney, Agent, or Firm* — Westerman, Hattori, Daniels & Adrian, LLP

(57) ABSTRACT

Provided is a linear-motion bearing, including: an outer cylinder member made of a synthetic resin, the outer cylinder member having a plurality of endless steel ball circulation paths each including an outer-peripheral-side steel ball circulation path and an inner-peripheral-side steel ball circulation path, and having sheet-like spaces in regions that are opposed to the endless steel ball circulation paths, respectively; a plurality of steel balls accommodated and arrayed in the endless steel ball circulation paths; and a synthetic resin plate, which has an arc cross section, and is fitted to each of the sheet-like spaces, the synthetic resin plate including a metal piece at a position at which the synthetic resin plate is held in contact with a steel ball row in the inner-peripheral-side steel ball circulation path, the metal piece having an elongated shape in a direction along the steel ball row in the inner-peripheral-side steel ball circulation path, in which the elongated metal piece is curved so as to protrude toward an inner peripheral side of the outer cylinder member in the direction along the steel
(Continued)

ball row in the inner-peripheral-side steel ball circulation path.

6 Claims, 8 Drawing Sheets

(58) Field of Classification Search
CPC .......................... F16C 29/0678; F16C 29/068; F16C 29/0683; F16C 29/0688; F16C 29/0689; F16C 29/084
See application file for complete search history.

(56) References Cited

U.S. PATENT DOCUMENTS

| 5,613,780 | A | * | 3/1997 | Ng | F16C 29/0616 |
| | | | | | 29/898.03 |
| 6,186,664 | B1 | | 2/2001 | Yamazaki et al. | |
| 6,409,387 | B1 | | 6/2002 | Yokohari | |

FOREIGN PATENT DOCUMENTS

| JP | S57-33218 A | 2/1982 |
| JP | S59-58226 A | 4/1984 |
| JP | H06-20922 U | 3/1994 |
| JP | H07-269570 A | 10/1995 |
| JP | H11-270558 A | 10/1999 |
| JP | H11-311247 A | 11/1999 |
| JP | 2001-116043 A | 4/2001 |
| JP | 2009-287645 A | 12/2009 |
| JP | 2018-13157 A | 1/2018 |

* cited by examiner

LINEAR BEARING AND LINEAR BEARING WITH HOUSING

TECHNICAL FIELD

The present invention relates to a linear-motion bearing, and more particularly, to a linear-motion bearing equipped with an outer cylinder member made of a synthetic resin suitable for use under a state of being inserted into a housing. Moreover, the present invention relates to a linear-motion bearing mounted to the housing.

BACKGROUND ART

Hitherto, as a linear-motion bearing also called a linear bearing, which is configured to guide a rod (shaft body) while allowing a smooth reciprocating motion of the rod in a length direction thereof, there has been known a linear-motion bearing including an outer cylinder, a tubular steel ball cage (retainer), which is provided inside the outer cylinder, and includes a plurality of endless steel ball circulation paths, and a plurality of steel balls (balls) accommodated in the endless steel ball circulation paths of the retainer. A large number of linear-motion bearings having various sizes have hitherto been used for various purposes.

As described above, many of the related-art linear-motion bearings each include the outer cylinder, and the cylindrical retainer provided inside the outer cylinder. The balls are accommodated and retained in the retainer under a state of slightly protruding to an inner peripheral side and an outer peripheral side of the retainer. The rod, which is to be guided by the linear-motion bearing, is inserted into the inner peripheral side of the retainer to be supported so as to be slidable. Through sliding of the rod in the length direction, or through sliding of an integrated configuration of the outer cylinder and the retainer along the rod, the balls accommodated and retained in the retainer are configured to rotate inside the retainer while applying pressure to, and being held in contact with an inner peripheral surface of the outer cylinder. Therefore, the outer cylinder is required to have high durability. Thus, typically, the outer cylinder has hitherto been made of a metal material.

However, in recent years, not only high durability but also reduction in weight has been demanded for the linear-motion bearing. Instead of the outer cylinder made of a metal material, a synthetic-resin outer cylinder manufactured through molding of a synthetic resin material is also beginning to be used. However, the synthetic-resin outer cylinder has insufficient strength (resistance) against the pressure applied by the balls, which are accommodated in each endless steel ball circulation path at positions of being held in contact with an outer-peripheral-side circulation path of the circulation path, to a region of the outer cylinder covering the positions. Thus, typically, a metal piece for reinforcement is fitted to the region covering the positions. The linear-motion bearing having such a configuration is advantageous in that the linear-motion bearing is lightweight and high in durability, and hence is often used in actuality. The linear-motion bearing employing the synthetic-resin outer cylinder having such configuration is often used particularly under a state of being inserted in and fixed to a housing having a hole portion.

In Patent Literature 1 (Japanese Patent Application Laid-open No. Hei 11-311247), the following description is made. Specifically, as a bearing member, which includes a housing having an outer cylinder received therein, and a shaft to be inserted into the outer cylinder, and is configured to allow the housing provided with the outer cylinder to linearly slide with respect to the shaft, there has hitherto been known a bearing member having a configuration in which the housing is made of a metal and the outer cylinder is made of a synthetic resin, and in which metallic aligning plates are additionally provided to the outer cylinder. In Patent Literature 1, there is disclosed the invention of the bearing member, which includes the synthetic-resin housing in which the outer cylinder is received, and the shaft to be inserted into the outer cylinder. In the bearing member, the outer cylinder and the housing are configured to linearly slide in an integrated manner with respect to the shaft, and the outer cylinder has endless ball circulation paths each including a load portion and a no-load portion. Balls are arranged in the endless ball circulation paths through a cage. The aligning plates are provided to the outer cylinder, and a wear-resistant member is provided on the housing at a position of being brought into abutment against the aligning plates. However, in Patent Literature 1, it is not described that the above-mentioned aligning plates have a function as a reinforcement member for the outer cylinder, and no description is made of a material for forming the outer cylinder of the invention.

In Patent Literature 2 (Japanese Patent Application Laid-open No. 2001-116043), as a ball bushing capable of reducing a press-fitting force and a deformation amount when the ball bushing is fits into a hole portion of, for example, a machine part and is capable of easily and reliably performing the fitting, there is disclosed the following linear-motion bearing (ball bushing). Specifically, a plurality of balls are arranged on an inner peripheral wall of a cylindrical body so as to be rollable. A rod is inserted into the cylindrical body, and an outer peripheral wall of the rod is held in contact with the balls. Both end portions of an outer peripheral wall of the cylindrical body are each formed into a tapered shape, and a recessed portion is formed in an entire region or a part of the outer peripheral wall of the cylindrical body excluding the both end portions. However, no description is made of means for retaining the plurality of balls in a rollable manner on the inner peripheral surface of the cylindrical body.

In Patent Literature 3 (Japanese Patent Application Laid-open No. Hei 7-269570), description is made of a linear-motion bearing (ball spline) including a synthetic-resin outer cylinder, and a retainer (ball cage) having endless steel ball circulation paths. In the retainer, metallic balls are accommodated and retained under a state of slightly protruding to each of an inner peripheral side and an outer peripheral side of the retainer. It is also described that ball support plates made of a metal material are provided at positions opposed to the endless steel ball circulation paths of the outer cylinder.

In Patent Literature 4 (Japanese Utility Model Application Laid-open No. Hei 6-20922), there is disclosed a linear sliding bearing (that is, a linear-motion bearing) including an outer cylinder, a retainer arranged inside the outer cylinder, balls retained by the retainer, ball support plates configured to support the balls from an outer side of the balls fitted into an outer surface of the outer cylinder so as to be freely movable. A seal ring and a side ring configured to retain the seal ring are provided on each end surface of the outer cylinder under a state of being fixed to the outer cylinder, and the seal ring is arranged so as to be freely movable between the end surface of the outer cylinder and the side ring.

DISCLOSURE OF THE INVENTION

Problems to be Solved by Invention

As described above, in Patent Literature 1, it is described that the linear-motion bearing, which has the configuration in which the outer cylinder is made of a synthetic resin and the metallic aligning plates are additionally provided to the outer cylinder, is accommodated in the housing, and that use of the above-mentioned linear-motion bearing under the received state has been known. Further, in Patent Literature 1, it is described that the balls are accommodated in the retainer on the inner peripheral side of the outer cylinder. The retainer has the endless steel ball circulation paths, and the balls are configured to retain the rod so as to be slidable. In Patent Literature 2, as the linear-motion bearing involving the small press-fitting force and less deformation when the linear-motion bearing is fitted into the hole portion of the housing, there is disclosed the linear-motion bearing (ball bushing) in which the both end portions of the outer peripheral wall of the cylindrical body of the outer cylinder are each formed into a tapered shape, and the recessed portion is formed in an entire region or a part of the outer peripheral wall of the cylindrical body excluding the both end portions.

With reference to the above-mentioned structure of the linear-motion bearings that have hitherto been known, the inventors of the present invention have made extensive investigations in order to develop a linear-motion bearing that is suitable particularly for use under a state of being inserted and fixed in a hole portion of a housing, and is lightweight and easily manufactured. As a result, the inventor of the present invention has found out that a linear-motion bearing having the following novel configuration achieves the above-mentioned object. Specifically, the linear-motion bearing includes: an outer cylinder member, which is made of a synthetic resin, the outer cylinder member having a plurality of endless steel ball circulation paths each including an outer-peripheral-side steel ball circulation path and an inner-peripheral-side steel ball circulation path, and having sheet-like spaces in regions that are opposed to the endless steel ball circulation paths, respectively; a plurality of steel balls accommodated and arrayed in the endless steel ball circulation paths; and a synthetic resin plate, which has an arc cross section and is fitted to each of the sheet-like spaces, the synthetic resin plate including a metal piece at a position at which the synthetic resin plate is held in contact with a steel ball row in the inner-peripheral-side steel ball circulation path, the metal piece having an elongated shape in a direction along the steel ball row in the inner-peripheral-side steel ball circulation path. The "inner-peripheral-side steel ball circulation path" described herein means a circulation path in which the steel ball row accommodated in the circulation path are held in contact with a surface of a shaft body (rod) inserted in the linear-motion bearing, and are held in contact with the metal piece of the synthetic resin plate.

That is, the above-mentioned linear-motion bearing having the novel configuration is a linear-motion bearing having the following configuration as a basic configuration. Specifically, the integrated structural body including the outer cylinder and the retainer, which has been used in the related-art linear-motion bearing (herein, the integrated structural body is referred to as "an outer cylinder member"), is manufactured through molding of a synthetic resin, and a metal piece (or a metal plate) is fitted into an outer peripheral portion of the outer cylinder member.

In order to confirm practicality of the above-mentioned linear-motion bearing having the novel configuration, the inventor of the present invention made detailed study on practical performance and durability as the linear-motion bearing under such a condition that the rod (shaft body) is caused to repeat the reciprocating motion under a state in which the linear-motion bearing is inserted and fixed in the hole portion of the housing and the rod is mounted in an inner peripheral portion of the linear-motion bearing. As a result of the study, it was found out that the above-mentioned linear-motion bearing having the novel configuration exhibited satisfactory performance as a device for supporting the smooth and repeated reciprocating motion of the rod, but sometimes involved a trouble in that the linear-motion bearing was more liable to slip out of the hole portion of the housing after the reciprocating motion was repeated for a long period of time or a long time.

The inventor of the present invention made further study in order to discover the cause of the trouble in that the above-mentioned linear-motion bearing having the novel configuration slips out of the hole portion of the housing. As a result, it was confirmed that the trouble was caused when the outer cylinder member molded of a synthetic resin, that is, a synthetic-resin molded body obtained by integrating the outer cylinder and the retainer together was deformed due to heat generated by the repeated reciprocating motion of the rod in the inner peripheral portion of the linear-motion bearing.

Means for Solving the Problems

Based on the confirmed result of the cause of the trouble in which the above-mentioned linear-motion bearing having the novel configuration slips (falls) out of the hole portion of the housing, the inventors of the present invention have made extensive investigations to solve the trouble as a new object. As a result of the investigations, the inventors of the present invention have found out that, in the above-mentioned linear-motion bearing having the novel configuration, when the elongated metal piece is curved so as to protrude toward an inner peripheral side of the outer cylinder member in a direction along a steel ball row in an inner-peripheral-side steel ball circulation path, the trouble is suppressed effectively. Thus, the inventor of the present invention has conceived the present invention.

Therefore, the present invention provides a linear-motion bearing having the following configuration.

There is provided a linear-motion bearing, including: an outer cylinder member made of a synthetic resin, the outer cylinder member having a plurality of endless steel ball circulation paths each including an outer-peripheral-side steel ball circulation path and an inner-peripheral-side steel ball circulation path, and having sheet-like spaces in regions that are opposed to the endless steel ball circulation paths, respectively; a plurality of steel balls accommodated and arrayed in the endless steel ball circulation paths; and a synthetic resin plate, which has an arc cross section, and is fitted to each of the sheet-like spaces, the synthetic resin plate including a metal piece at a position at which the synthetic resin plate is held in contact with a steel ball row in the inner-peripheral-side steel ball circulation path, the metal piece having an elongated shape in a direction along the steel ball row in the inner-peripheral-side steel ball circulation path, wherein the elongated metal piece is curved so as to protrude toward an inner peripheral side of the outer cylinder member in the direction along the steel ball row in the inner-peripheral-side steel ball circulation path.

The linear-motion bearing having the above-mentioned configuration according to the present invention is particularly effective as a linear-motion bearing to be used under a state of being inserted and fixed in a hole portion of a housing having the hole portion.

Thus, the present invention is also a linear-motion bearing equipped with a housing, including:

a housing having a hole portion; and the above-mentioned linear-motion bearing, which is inserted in and fixed to the hole portion.

In the following, description is made of a preferred mode of the linear-motion bearing according to the present invention.

(1) The elongated metal piece has an arc cross section expanding toward the inner peripheral side of the outer cylinder.

(2) A curvature ratio represented by a ratio (H/L) of a height (H) of an apex of a curved portion to a length (L) of the elongated metal piece falls within a range of from 0.001 to 0.05.

(3) At least three protrusions, which have the same diameter, and are formed on an outer peripheral surface of the outer cylinder member into an annular shape along a circumference of the outer cylinder member so as to be parallel to each other along a length direction of the outer cylinder member.

(4) An annular outer-cylinder reinforcement member, which is formed of an elastic member, and is fitted into an intimate contact manner to each end portion of an inner peripheral portion of the outer cylinder member without being bonded and fixed to the each end portion.

In order to "prevent the trouble in which the linear-motion bearing falls (slips) out of the hole portion of the housing," which the effect of the present invention, the configuration described in the item (3) "the linear-motion bearing includes at least three protrusions, which have the same diameter, and are formed on an outer peripheral surface of the outer cylinder member into an annular shape along a circumference of the outer cylinder member so as to be parallel to each other along a length direction of the outer cylinder member" is effective even without combination with the mode of "fitting the elongated metal piece, which is curved so as to protrude toward the inner peripheral side in the direction along the steel ball row in the inner-peripheral-side steel ball circulation path".

In order to "prevent the trouble in which the linear-motion bearing falls (slips) out of the hole portion of the housing," which is the effect of the present invention, the configuration described in the item (4) "The linear-motion bearing, further comprising an annular outer-cylinder reinforcement member, which is formed of an elastic member and is fitted into an intimate contact manner to each end portion of an inner peripheral portion of the outer cylinder member without being bonded and fixed to the each end portion." is effective even without combination with the mode of "fitting the elongated metal piece, which is curved so as to protrude toward the inner peripheral side in the direction along the steel ball row in the inner-peripheral-side steel ball circulation path".

Effects of the Invention

The linear-motion bearing according to the present invention employs the outer cylinder member as a main component. The outer cylinder member is obtained by integrating the outer cylinder and the retainer that are both made of a synthetic resin. Thus, the linear-motion bearing according to the present invention is easily manufactured and lightweight, and is easily and smoothly inserted in and fixed to the hole portion of the housing. Further, both end portions of the elongated metal piece of the metal-piece-equipped synthetic resin plate fitted to the outer cylinder member, and/or portions of the synthetic-resin plate held in contact with the both end portions project, albeit slightly, outward beyond the outer peripheral portion of the outer cylinder member. Accordingly, when the linear-motion bearing is inserted in and fixed to the hole portion of the housing having the hole portion and the shaft body (rod) is inserted into the linear-motion bearing, the projecting end portions of the metal piece or the portions of the synthetic-resin plate held in contact with the end portions are brought into contact with an inner surface of the hole portion of the housing, thereby improving stability of fixation of the linear-motion bearing in the hole portion of the housing. Therefore, the linear-motion bearing according to the present invention has such an advantage that the trouble in which the linear-motion bearing falls (slips) out of the hole portion of the housing is less liable to occur even after the rod is inserted into the inner peripheral portion of the retainer and slid for a long period of time or a long time under a state in which the linear-motion bearing according to the present invention is inserted in and fixed to the hole portion of the housing.

Further, through use of the linear-motion bearing according to the present invention, stable linear motion (that is, involving less "shaking" and less "chattering") of the shaft body (rod) inserted into the linear-motion bearing is achieved.

MODE FOR CARRYING OUT THE INVENTION

Next, a linear-motion bearing and a linear-motion bearing equipped with a housing according to the present invention are described in detail with reference to the accompanying drawings.

Figure 1:
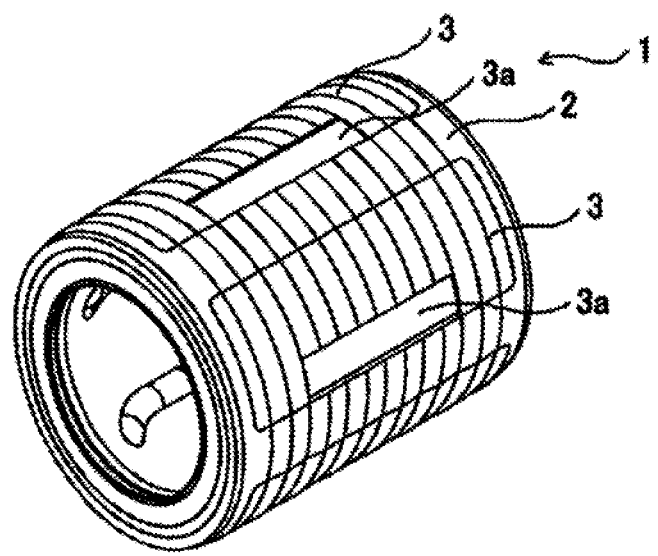
FIG. 1 is a perspective view for illustrating an example of a configuration of a linear-motion bearing according to the present invention.
Figure 2:
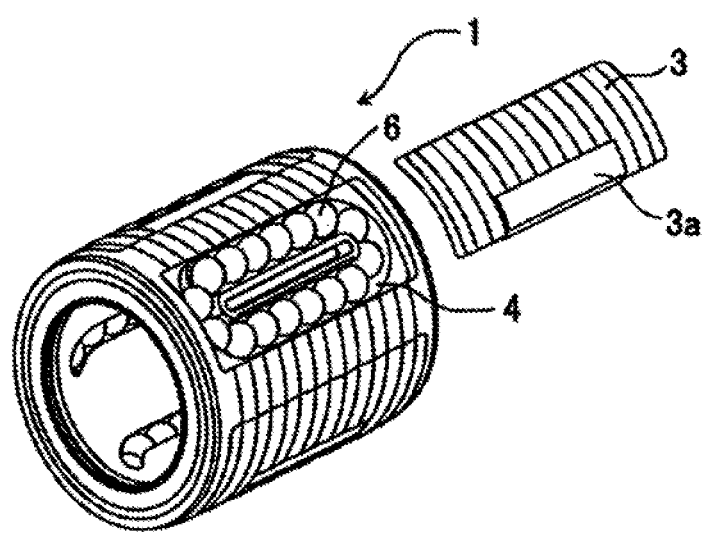
FIG. 2 is a perspective view for illustrating a state of removing one of metal-piece-equipped synthetic resin plates fitted to an outer cylinder member of the linear-motion bearing of FIG. 1.
Figure 3:
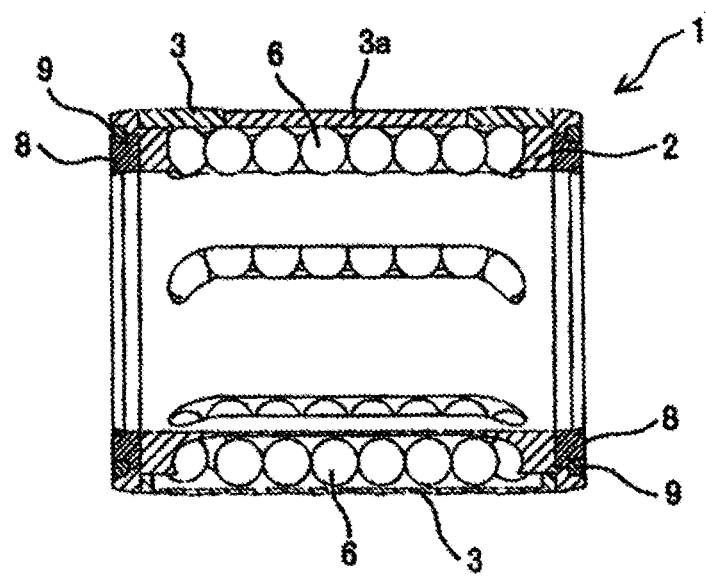
FIG. 3 is a sectional view of the linear-motion bearing of FIG. 1 (sectional view for illustrating a cross section taken along an axial direction of the linear-motion bearing).
Figure 4:
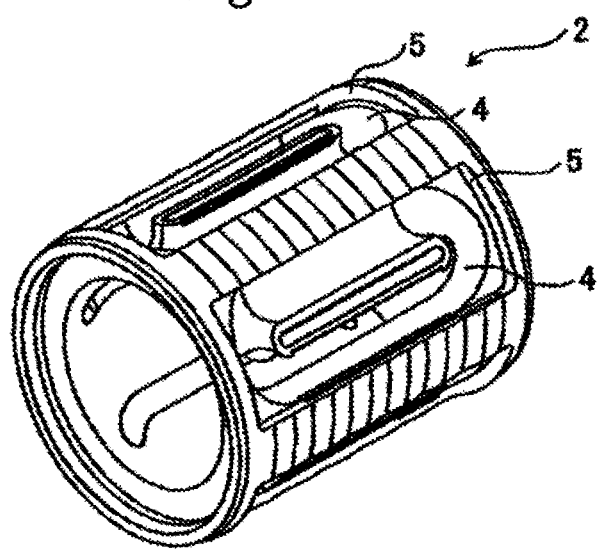
FIG. 4 is a perspective view for illustrating the outer cylinder member forming the linear-motion bearing of FIG. 1.

FIG. 1 is a perspective view for illustrating an example of a configuration of a linear-motion bearing 1 according to the present invention. FIG. 2 is a perspective view for illustrating a state of removing one of metal-piece-equipped synthetic resin plates 3 fitted to an outer cylinder member 2 of the linear-motion bearing 1 illustrated in FIG. 1. FIG. 3 is a sectional view of the linear-motion bearing 1 of FIG. 1 (sectional view for illustrating a cross section taken along an axial direction of the linear-motion bearing 1). FIG. 4 is a perspective view for illustrating the outer cylinder member 2 functioning as a frame body forming the linear-motion bearing of FIG. 1.

As illustrated in FIG. 1 to FIG. 4, the linear-motion bearing 1 according to the present invention includes a plurality of endless steel ball circulation paths 4 each including an outer-peripheral-side steel ball circulation path and an inner-peripheral-side steel ball circulation path, and includes the outer cylinder member 2 made of a synthetic resin. The outer cylinder member 2 has sheet-like spaces 5 in regions that are opposed to the endless steel ball circulation paths 4, respectively. That is, the outer cylinder member 2 is a structural body manufactured through molding of a synthetic resin, preferably, integral molding thereof so as to serve as both an outer cylinder and a retainer, which are typically used as components of a related-art linear-motion bearing.

A plurality of steel balls (balls) 6 are loaded and arranged in each of the endless steel ball circulation paths 4. The metal-piece-equipped synthetic resin plates 3 are respectively fitted into the sheet-like spaces 5 formed in the outer cylinder member 2. A metal piece 3a of each of the metal-piece-equipped synthetic resin plates 3 is fitted to a region covering portions of the steel balls (balls) 6 in the inner-peripheral-side steel ball circulation path, which is configured to rotate and move while applying pressure to and being held in contact with a shaft body (rod, although not shown) inserted in the linear-motion bearing 1. For formation of the outer cylinder member 2 and synthetic-resin plate portions of the metal-piece-equipped synthetic resin plates 3, there is used a synthetic resin such as a polyacetal resin, which has high mechanical strength and is called an engineering plastic. The polyacetal resin has hitherto been used as a material for an outer cylinder and a tubular steel ball cage of the linear-motion bearing made of a synthetic resin.

There is provided a linear-motion bearing, including: an outer cylinder member, which is made of a synthetic resin, the outer cylinder member having a plurality of endless steel ball circulation paths each including an outer-peripheral-side steel ball circulation path and an inner-peripheral-side steel ball circulation path, and having sheet-like spaces in regions that are opposed to the endless steel ball circulation paths, respectively; a plurality of steel balls accommodated and arrayed in the endless steel ball circulation paths; and a synthetic resin plate, which has an arc cross section and is fitted to each of the sheet-like spaces, the synthetic resin plate including a metal piece at a position at which the synthetic resin plate is held in contact with a steel ball row in the inner-peripheral-side steel ball circulation path, the metal piece 3a having an elongated shape in a direction along the steel ball row in the inner-peripheral-side steel ball circulation path, in which the elongated metal piece 3a is curved so as to protrude toward an inner peripheral side of the outer cylinder member in the direction along the steel ball row in the inner-peripheral-side steel ball circulation path.

Figure 5:
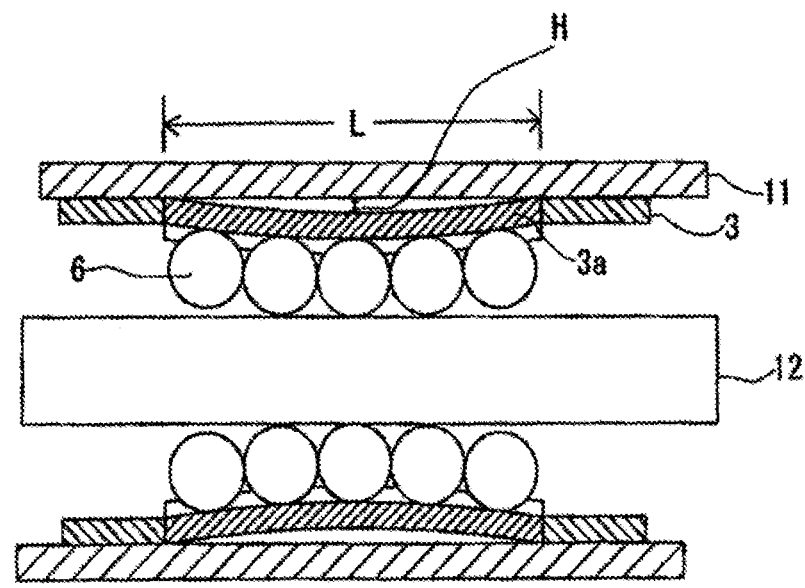
FIG. 5 is a view for exaggeratedly illustrating a curved state of an elongated metal piece of each of the metal-piece-equipped synthetic resin plates to be used for the linear-motion bearing according to the present invention.

FIG. 5 is a conceptual view for exaggeratedly illustrating a curved state of the elongated metal piece 3a curved so as to protrude toward an inner peripheral side of the outer cylinder member in a direction along a steel ball row in the inner-peripheral-side steel ball circulation path, which is a main characteristic of the linear-motion bearing according to the present invention. In FIG. 5, it is preferred that a degree of the curve of the elongated metal piece 3a (curvature ratio represented by a ratio (H/L) of a height (H) of an apex of the curved portion to a length (L) of the elongated metal piece 3a) be within a range of from 0.001 to 0.05. In particular, it is preferred that the degree of the curve of the elongated metal piece 3a be within a range of from 0.001 to 0.01. As described above, when the linear-motion bearing according to the present invention is inserted into a hole portion of the housing having the hole portion, and the shaft body (rod) is inserted into the linear-motion bearing, the apex of the curve of the metal piece 3a curved toward the inner peripheral side is brought into contact with the steel ball row in the inner-peripheral-side steel ball circulation path, and both end portions of the metal piece 3a and/or portions of the synthetic-resin plate held in contact with the both end portions project, albeit slightly, outward beyond an outer peripheral portion of the outer cylinder member. As a result, the projecting end portions of the metal piece 3a and/or the portions of the synthetic-resin plate held in contact with the end portions are brought into contact with an inner surface of the hole portion of the housing, thereby improving stability of fixation of the linear-motion bearing in the hole portion of the housing. Further, the metal piece 3a is curved, and hence the curved metal piece exerts a spring action when the shaft body (rod) is inserted, to thereby apply pre-load to the shaft body through the steel balls held in contact with the metal piece. Accordingly, an action of holding the shaft body (rod) inserted in the linear-motion bearing is exerted, thereby achieving stable linear motion of the shaft body (rod) (that is, involving less "shaking" and less "chattering").

Figure 6:
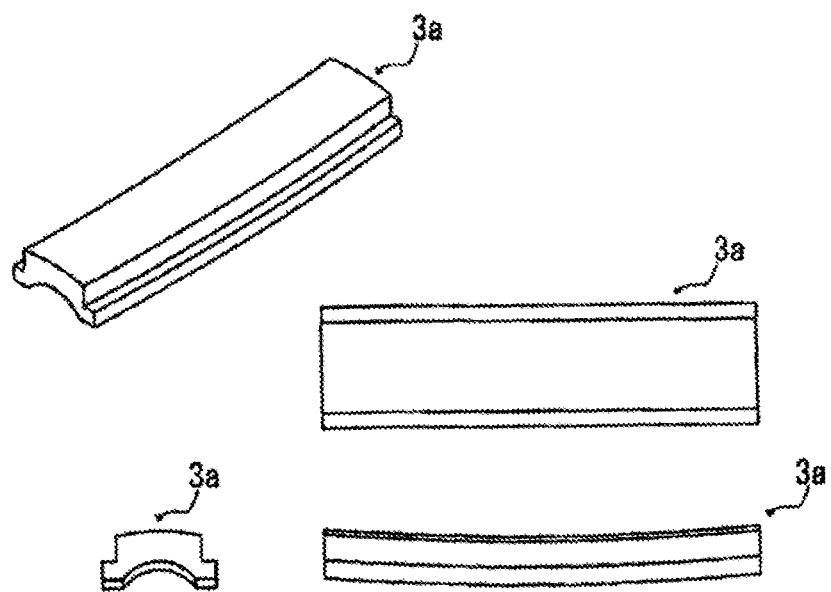
FIG. 6 are a perspective view, a plan view, a side view, and a front view of the elongated metal piece of each of the metal-piece-equipped synthetic resin plates to be used for the linear-motion bearing according to the present invention.

FIG. 6 area perspective view (upper left), a plan view (upper right), a side view (lower left), and a front view (lower right) of the elongated metal piece 3a of each of the metal-piece-equipped synthetic resin plates to be used for the linear-motion bearing according to the present invention. As described above, the metal piece 3a is curved so as to protrude toward the inner peripheral side in the direction along the steel ball row in the inner-peripheral-side steel ball circulation path (see FIG. 5), but the degree of the curve is significantly small. Thus, it may be difficult to visually recognize the curve of the metal piece 3a. As illustrated in the perspective view and the side view of FIG. 6, it is preferred that the metal piece 3a have such an arc cross section taken along a width direction of the metal piece 3a that the elongated metal piece expands toward the inner peripheral side of the outer cylinder (side on which the metal piece is held in contact with the steel balls (balls)).

Figure 7:
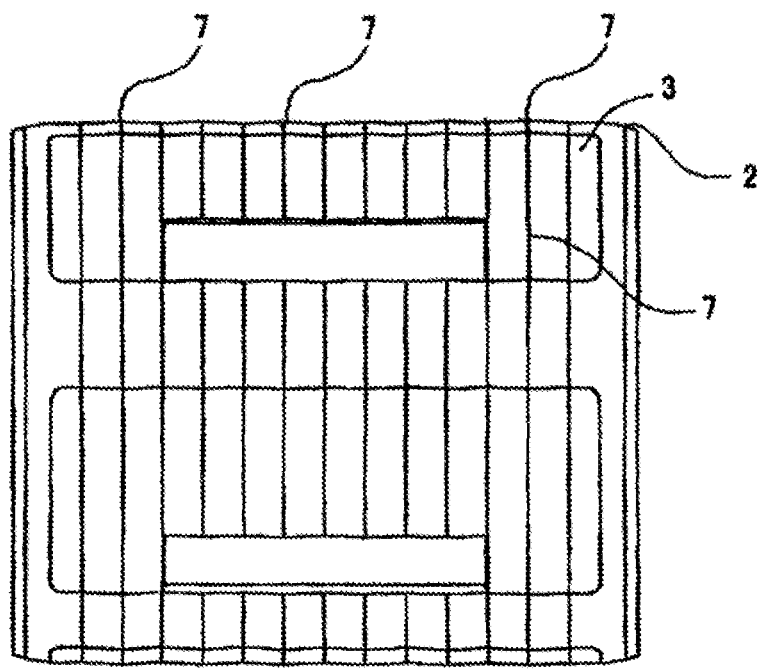
FIG. 7 is a front view of the linear-motion bearing of FIG. 1 (front view for illustrating a surface state of the outer cylinder in an enlarged manner).

As illustrated in FIG. 7, it is preferred that the linear-motion bearing according to the present invention include at least three annular protrusions 7 having the same diameter. The annular protrusions 7 are formed on an outer peripheral surface of the outer cylinder made of a synthetic resin so as to be parallel to each other along a length direction of the outer cylinder. The diameter of the annular protrusions having the same diameter means a distance between apexes of each annular protrusion measured under such a condition that a center axis of the outer cylinder is assumed as a symmetry axis. The description "the same diameter" covers substantially the same diameter. For example, when a difference between diameters of the annular protrusions is equal to or smaller than 10%, it can be assumed that the diameters of the annular protrusions are the same. Further, it is preferred that the at least three annular protrusions be respectively formed at least on both end portions and a center portion of the outer peripheral surface of the outer cylinder. Alternatively, it is preferred that four or more annular protrusions be formed at least on both end portions of the outer peripheral surface of the outer cylinder and between the both end portions at substantially equal intervals. Further, it is preferred that an apex of each of the annular protrusions have a circular-arc cross section. As illustrated in FIG. 7, it is preferred that the annular protrusions 7 be formed not only on the outer peripheral surface of the outer cylinder member 2 but also on outer peripheral surfaces of resin portions of the metal-piece-equipped plates.

Figure 8:
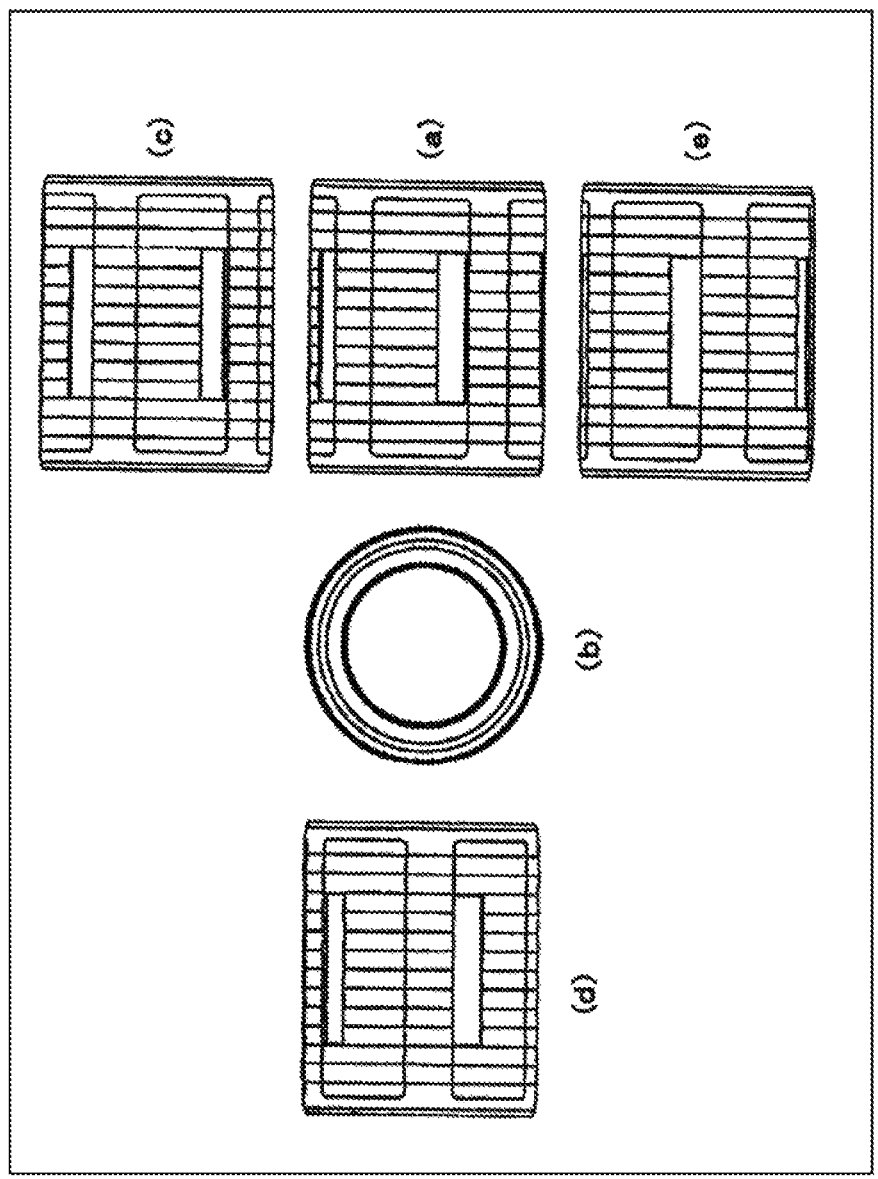
FIG. 8 are a front view (a), a side view (b) (a left-hand side view and a right-hand side view are the same shapes), a plan view (c), a back view (d), and a bottom view (e) of the outer cylinder of the linear-motion bearing of FIG. 1.

FIG. 8 area front view (a), a side view (b) (a left-hand side view and a right-hand side view are the same shapes), a plan view (c), a back view (d), and a bottom view (e) of the linear-motion bearing according to the present invention illustrated in FIG. 1.

Figure 9:
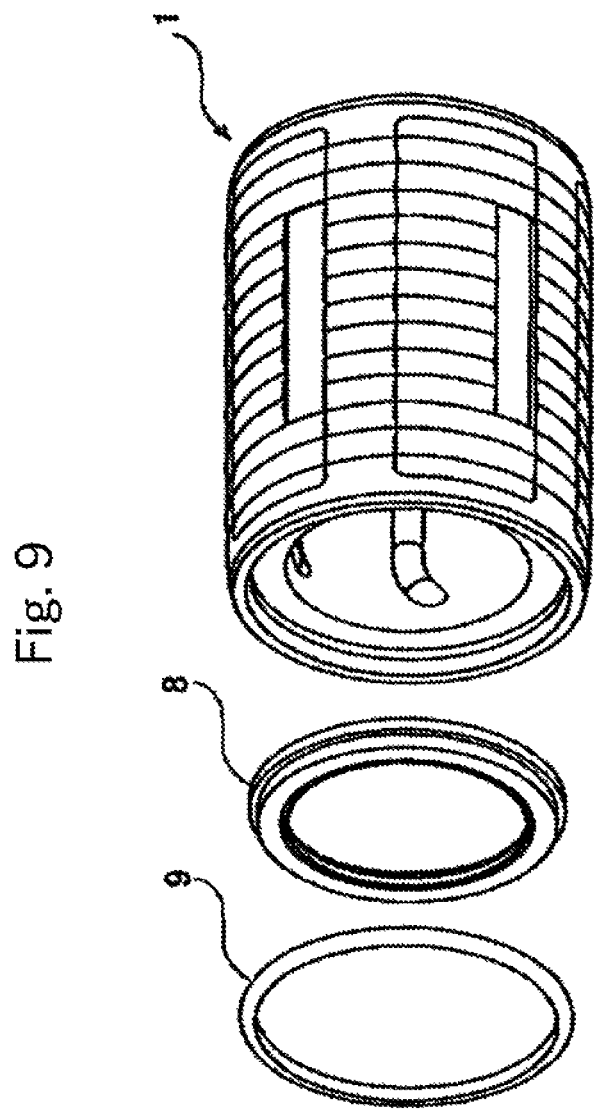
FIG. 9 is an exploded view for illustrating the configuration of the linear-motion bearing of FIG. 1.

As illustrated in FIG. 3 and FIG. 9, it is preferred that an annular sealing member 8 be fitted to each end portion of an inner peripheral portion of the outer cylinder member of the linear-motion bearing according to the present invention. The annular sealing member 8 is configured to prevent entry of foreign particles and dust into the linear-motion bearing. It is preferred that the annular sealing member 8 be made of a rubber material or a synthetic resin material.

Moreover, as illustrated in FIG. 3 and FIG. 9, it is preferred that an annular outer-cylinder reinforcement member 9 be fitted to each end portion of the inner peripheral portion of the outer cylinder member 2 of the linear-motion bearing according to the present invention. The annular outer-cylinder reinforcement member 9 is made of an elastic material. The annular outer-cylinder reinforcement member 9 is fitted to each end portion of the outer cylinder member 2 on an inner surface side thereof so that an outer peripheral surface of the annular outer-cylinder reinforcement member 9 is held in intimate contact with an inner peripheral surface of the outer cylinder member 2 under a tense state of pushing and expanding the outer cylinder member 2 to an outer peripheral side of the outer cylinder member 2. However, the annular outer-cylinder reinforcement member 9 is not bonded and fixed to the outer cylinder member 2. This is because, when the annular outer-cylinder reinforcement member 9 is bonded and fixed to the outer cylinder 2, an effect of pushing and expanding the outer cylinder member 2 to the outer peripheral side by the annular outer-cylinder reinforcement member 9 cannot be expected. Further, as illustrated in FIG. 3 and FIG. 9, it is preferred that the annular outer-cylinder reinforcement member 9 be fitted to an outer side of the annular sealing material.

Figure 10:
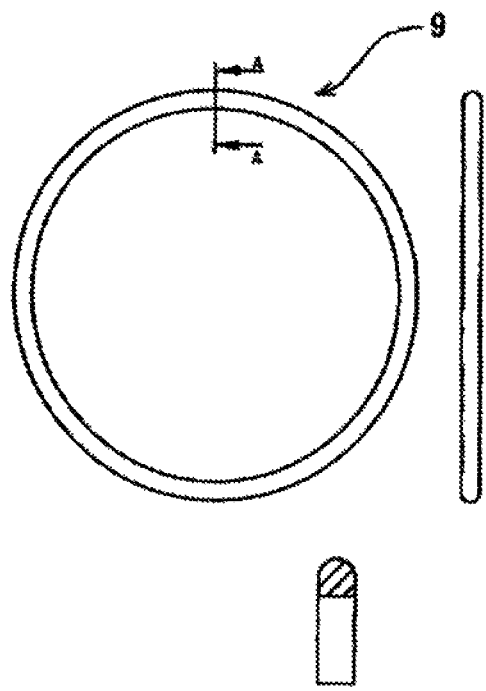
FIG. 10 are a front view, a side view, and a partial sectional view for illustrating a shape of an annular outer-cylinder reinforcement member of the linear-motion bearing illustrated in FIG. 9.
Figure 11:
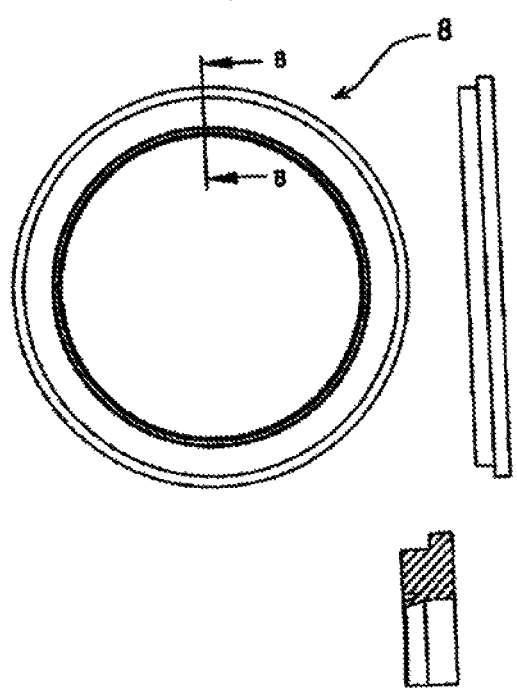
FIG. 11 are a front view, a side view, and a partial sectional view for illustrating a shape of an annular sealing member illustrated in FIG. 9.

FIG. 10 are a front view (upper left view), aside view (upper right view), and a partial sectional view (lower left view) for illustrating a shape of the annular outer-cylinder reinforcement member 9. FIG. 11 area front view (upper left view), a side view (upper right view), and a partial sectional view (lower left view) for illustrating a shape of the annular sealing member 8.

It is preferred that the annular outer-cylinder reinforcement member 9 be made of a metal material such as steel, stainless steel, or brass. However, the annular outer-cylinder reinforcement member 9 may be made of a synthetic resin as long as heat resistance of the synthetic resin for the annular outer-cylinder reinforcement member 9 is higher than that of a synthetic resin for forming the outer cylinder. The heat resistance in this case can also be referred to as a thermosoftening temperature. As examples of such a synthetic resin material, a polyether ether ketone (PEEK) resin (typically, called a PEEK material) can be given when a case of making the outer cylinder member of a polyacetal resin is assumed. Alternatively, fiber reinforced plastics (FRP) can be used. It is preferred that the annular outer-cylinder reinforcement member 9 be formed of an annular member having a continuous entire periphery. However, in consideration of easiness of fitting the annular outer-cylinder reinforcement member 9 to the inner peripheral surface of the outer cylinder 2, the annular outer-cylinder reinforcement member 9 may be formed of an annular member (so-called C-shaped ring) having a discontinuous part.

Figure 12:
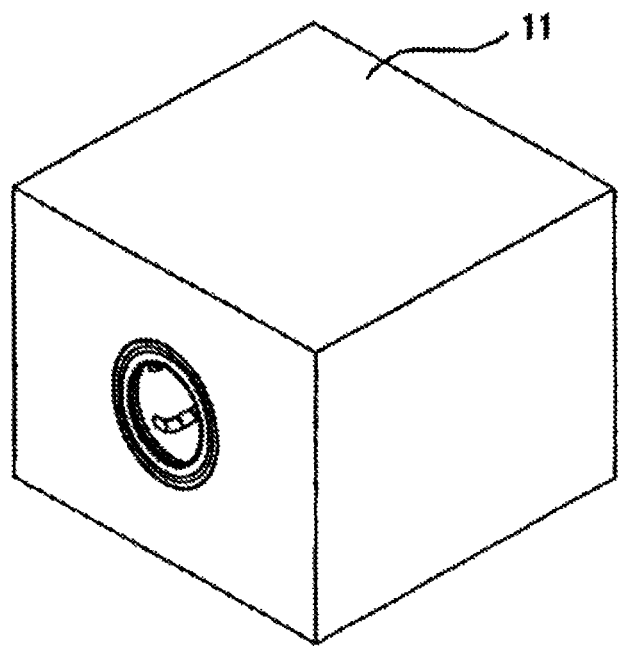
FIG. 12 is a perspective view for illustrating a configuration example under a state in which the linear-motion bearing according to the present invention is inserted and fixed in a hole portion of a housing.
Figure 13:
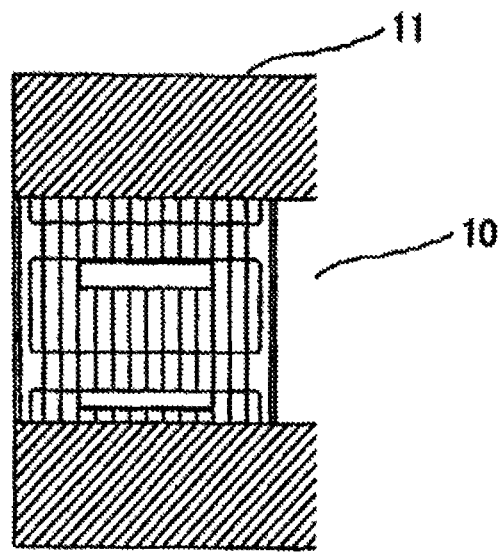
FIG. 13 is a sectional view for illustrating a configuration under a state in which the linear-motion bearing of FIG. 12 is inserted and fixed in the hole portion of the housing. However, the linear-motion bearing in the housing is illustrated as a side view of the outer cylinder in order to make an inserted and fixed state of the outer cylinder apparent.

FIG. 12 and FIG. 13 are illustrations of a state in which the linear-motion bearing according to the present invention is mounted and fixed in a hole portion 10 of a housing 11 having the hole portion 10 passing through the housing 11. However, in FIG. 13, the linear-motion bearing in the housing is illustrated as a side view of the outer cylinder in order to make an inserted and fixed state of the outer cylinder apparent.

When the linear-motion bearing according to the present invention has a configuration in which the plurality of annular protrusions are formed on the outer peripheral surface of the above-mentioned outer cylinder member in addition to the predetermined curved structure of the metal pieces of the above-mentioned metal-piece-equipped synthetic resin plates, an action (retaining action) of preventing falling-out of the linear-motion bearing is improved by a frictional force between the apexes of the annular protrusions and the inner peripheral surface of the hole portion of the housing. When the above-mentioned annular outer-cylinder reinforcement member is further provided, an additional effect, that is, further improvement of the effect (retaining effect) of preventing falling-out of the linear-motion bearing is given by a force of pushing and expanding the outer cylinder member to the outer peripheral side by the annular outer-cylinder reinforcement member.

The invention claimed is:
1. A linear-motion bearing that is inserted and fixed in a hole portion of a housing and that guides a rod, comprising:
an outer cylinder member made of a synthetic resin, the outer cylinder member having a plurality of endless steel ball circulation paths each including an outer-peripheral-side steel ball circulation path and an inner-peripheral-side steel ball circulation path, and having spaces in regions that are opposed to the endless steel ball circulation paths, respectively;
a plurality of steel balls accommodated and arrayed in the endless steel ball circulation paths; and
a synthetic resin plate, which has an arc cross section, and is fitted to each of the spaces, with a metal piece being inserted into the synthetic resin plate and positioned within the synthetic resin plate to make contact with a steel ball row in the inner-peripheral-side steel ball circulation path, the metal piece having an elongated shape in a direction along the steel ball row in the inner-peripheral-side steel ball circulation path,
wherein the elongated metal piece is curved so as to protrude toward an inner peripheral side of the outer cylinder member in the direction along the steel ball row in the inner-peripheral-side steel ball circulation path, and
wherein when the rod is inserted into the outer cylinder member, the metal piece is pressed outward in the radial direction of the outer cylinder member via the steel ball row, and both ends of the metal piece in the direction along the steel ball row project outward from an outer peripheral surface of the outer cylinder member and brought into contact with an inner peripheral surface of the hole portion of the housing.

2. The linear-motion bearing according to claim 1, wherein the elongated metal piece has an arc cross section expanding toward the inner peripheral side of the outer cylinder member.

3. The linear-motion bearing according to claim 1, wherein a curvature ratio represented by a ratio (H/L) of a height (H) of an apex of a curved portion to a length (L) of the elongated metal piece is within a range of from 0.001 to 0.05.

4. The linear-motion bearing according to claim 1, further comprising an annular outer-cylinder reinforcement member, which is formed of an elastic member, and is fitted to each end portion of an inner peripheral portion of the outer cylinder member without being bonded and fixed to the each end portion.

5. A linear-motion bearing, comprising:
an outer cylinder member made of a synthetic resin, the outer cylinder member having a plurality of endless steel ball circulation paths each including an outer-peripheral-side steel ball circulation path and an inner-peripheral-side steel ball circulation path, and having spaces in regions that are opposed to the endless steel ball circulation paths, respectively;
a plurality of steel balls accommodated and arrayed in the endless steel ball circulation paths;
a synthetic resin plate, which has an arc cross section, and is fitted to each of the spaces, with a metal piece being inserted into the synthetic resin plate and positioned within the synthetic resin plate to make contact with a steel ball row in the inner-peripheral-side steel ball circulation path, the metal piece having an elongated shape in a direction along the steel ball row in the inner-peripheral-side steel ball circulation path; and
at least three protrusions, which have the same diameter, and are formed on an outer peripheral surface of the outer cylinder member into an annular shape along a circumference of the outer cylinder member so as to be parallel to each other along the circumference of the outer cylinder member and spaced apart from each other along a length direction of the outer cylinder member,
wherein the elongated metal piece is curved so as to protrude toward an inner peripheral side of the outer cylinder member in the direction along the steel ball row in the inner-peripheral-side steel ball circulation path.

6. An apparatus comprising:
a housing having a hole portion; and
a linear-motion bearing inserted in and fixed to the hole portion, the linear-motion bearing comprising:
an outer cylinder member made of a synthetic resin, the outer cylinder member having a plurality of endless steel ball circulation paths each including an outer-peripheral-side steel ball circulation path and an inner-peripheral-side steel ball circulation path, and having spaces in regions that are opposed to the endless steel ball circulation paths, respectively;
a plurality of steel balls accommodated and arrayed in the endless steel ball circulation paths; and
a synthetic resin plate, which has an arc cross section, and is fitted to each of the spaces, with a metal piece being inserted into the synthetic resin plate and positioned within the synthetic resin plate to make contact with a steel ball row in the inner-peripheral-side steel ball circulation path, the metal piece having an elongated shape in a direction along the steel ball row in the inner-peripheral-side steel ball circulation path,
wherein the elongated metal piece is curved so as to protrude toward an inner peripheral side of the outer cylinder member in the direction along the steel ball row in the inner-peripheral-side steel ball circulation path, and
wherein when a rod is inserted into the outer cylinder member, the metal piece is pressed outward in the radial direction of the outer cylinder member via the steel ball row, and both ends of the metal piece in the direction along the steel ball row project outward from an outer peripheral surface of the outer cylinder member and brought into contact with an inner peripheral surface of the hole portion of the housing.

* * * * *